Patented May 16, 1933

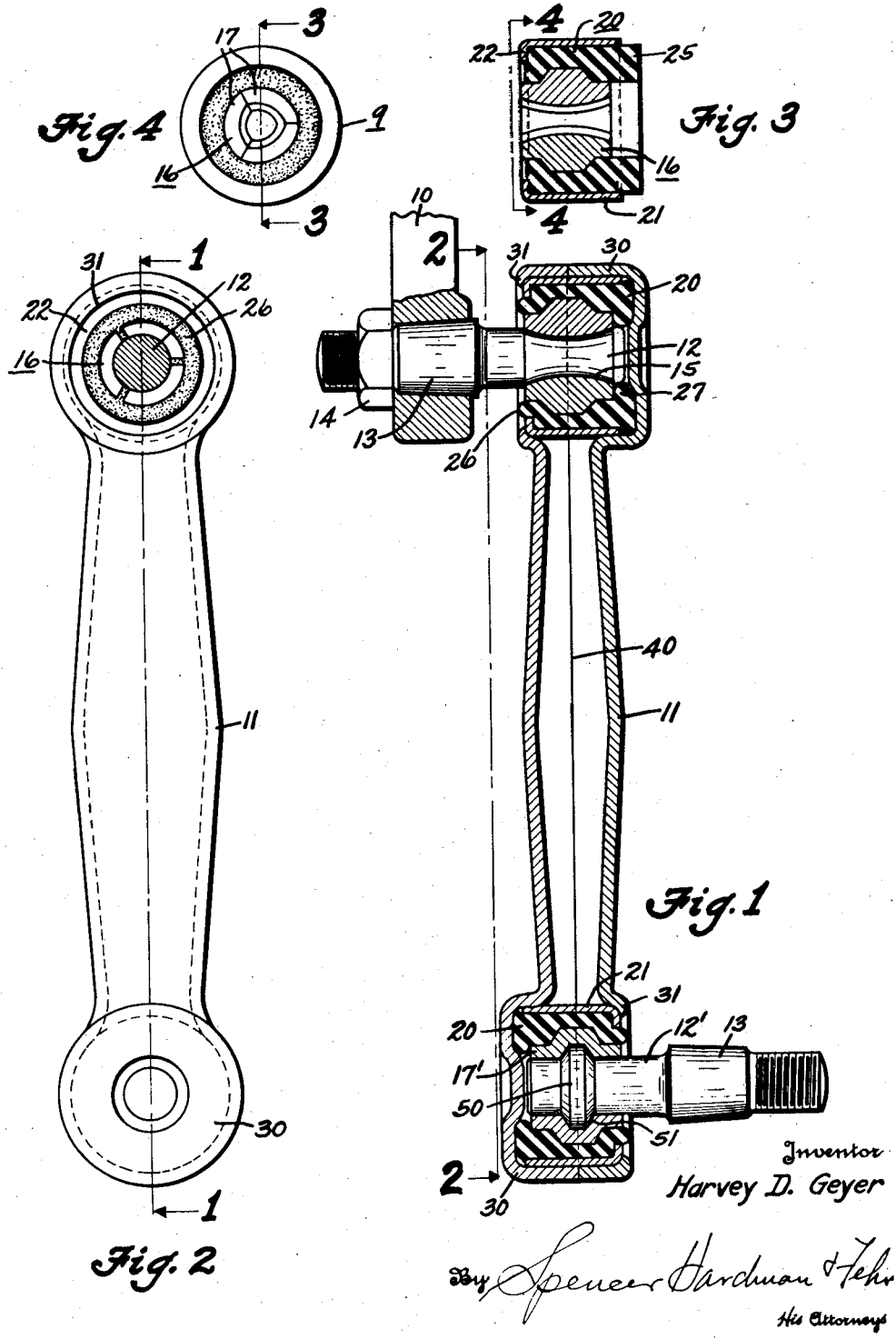

1,909,100

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

OSCILLATING JOINT

Application filed October 17, 1929. Serial No. 400,422.

This invention relates to oscillating pivot joints which permit also a slight universal movement between the parts connected thereby.

An object of this invention is to provide such a joint wherein the two connected parts are isolated from each other by resilient non-metallic material such as soft rubber, which resilient material provides for a limited universal movement between the connected parts by distortion thereof.

Another object is to provide such a joint which is efficient in use and very economically made and assembled upon the connected parts.

A feature of the invention is the vulcanization of the resilient rubber bushing to the segmental or split bearing bushing and also to the outer metal sleeve to form a permanently assembled unit, which unit is first inserted endwise over the pivot journal to its proper position and is then telescoped within and axially compressed by the metal housing and permanently retained therein.

Further objects and advantages of the present invention will be apparent from the following description, reference being had to the accompanying drawing wherein a preferred embodiment of one form of the present invention is clearly shown.

In the drawing:

Fig. 1 is a sectional view on line 1—1 of Fig. 2, through two oscillating pivot joints connecting a rigid thrust link to a swinging lever at the upper end and to a stationary pivot journal at the lower end thereof. Such mechanism may be used to connect the lever arm of a hydraulic shock absorber as used on present day autos to the lower pivot journal which is fixed to the car axle.

Fig. 2 is a side elevation on line 2—2 of Fig. 1.

Figs. 3 and 4 are detail views, showing in section and end elevations respectively the detached rubber unit with the metal parts vulcanized thereto.

Similar reference characters refer to similar parts throughout the several views.

Numeral 10 marks the lever arm which actuates the piston of a hydraulic shock absorber used on present day autos to control the main leaf springs. This arm 10 is actuated by a thrust link 11 which is connected thereto by an oscillating slightly universal pivot joint made according to this invention. Pivot pin 12 is rigidly fixed to the outer end of lever arm 10 by its tapered shank 13 and nut 14, or by any other suitable means. Pin 12 has an axially concave bearing surface 15, that is, its central diameter is smaller than its end diameters. The unit 9 shown in Figs. 3 and 4 comprises an inner segmental or split bushing 16 which in its expanded condition (shown in Fig. 1) conforms to and fits upon the concave bearing surface 15 of pivot pin 12. Bushing 16, as shown, is made from three separate segments 17 preferably from a self-lubricating material such as porous bronze impregnated with lubricant. The unit 9 comprises the three segments 17, the surrounding resilient rubber bushing 20 and the outer thin metal sleeve 21. The segments 17 and the sleeve 21 are preferably vulcanized in situ and bonded to the rubber bushing 20 by being suitably located in the vulcanizing mold in a manner which will be clear to those skilled in the art. When unit 9 comes from the vulcanizing mold the segments 17 may be closed into contacting position as shown in Fig. 4, or they may be vulcanized to the rubber in slightly spaced relation if it is so desired. This permanently assembled unit 9 is first assembled upon pin 12 by being forced endwise thereover until the segments 17 are seated properly upon the concave bearing surface 15. Of course, the rubber bushing 20 must yield and flow endwise to permit segments 17 to expand radially in order to pass over the enlarged head of pin 12. Rubber bushing 20 will thus be somewhat compressed when unit 9 is inserted upon pin 12. The next step is to telescope unit 9 axially into the cylindrical socket or housing 30 which is shown as formed integral with the stamped metal thrust link 11. Unit 9 is forced axially into the socket 30 causing the projecting portion 25 of rubber bushing 20 to first contact with the backwall of socket 30 and thus the rubber is put under high compression as will be obvious, and the unit 9 is retained in socket 30 in this compressed position by turning in the flange 31 of socket 30, which engages the inturned flange 22 of metal sleeve 20 and so holds all the parts in a permanently assembled compact relationship. The resilient rubber of bushing 20 flows under the force of its compression and takes a shape substantially as shown in Fig. 1. The rubber bulges outwardly at points 26 and radially inwardly at points 27 under the force of its compression and thus maintains the parts 12 and 16 completely isolated by resilient rubber from the housing 30 or any part rigid therewith.

In operation, pivotal movement between link 11 and journal pin 12 occurs by split sleeve 16 sliding upon the concave bearing surface of pin 12, the resilient bushing 20 maintaining the bearing segments 17 in their proper position upon the bearing surface of pin 12 at all times and causing an automatic take-up of all wear which may occur between these sliding parts. A small lateral swing of link 11 relative to arm 10 is also permitted by the yieldability of rubber bushing 20 and without metallic contact between parts rigid with arm 10 and those rigid with link 11, as will be clear from viewing Fig. 1. When this mechanism is used with automobile shock absorbers as herein described, such limited lateral swinging will occur due to the relative lateral movement or "side sway" of the chassis frame to the axle.

The link 11 is preferably made from two sheet metal stampings divided along the line 40 forming a hollow box-section strut of light section but very strong in compression. The recesses in the separate stampings which form the housings 30 can thus be very simply drawn out from the flat sheet stock when the link halves are pressed out by suitable dies. The two stamped link halves are welded together around the joint therebetween indicated in Fig. 1 by the line 40, this welding of course being done prior to the assembling of unit 9 into housing 30 as described above.

A modified form of this invention is shown at the lower end of link 11, all the parts being identical with the form above described except the shape of the bearing surface of the journal pin 12' and the bearing surfaces of segments 17' which seat thereupon. In this form, journal pin 12' has a radially projecting flange 50 at about the center of its bearing surface, and the bearing segments 17' have correspondingly shaped grooves 51 therein receiving the flange 50 and thus limiting any relative axial sliding between pin 12' and the bearing segments 17'. All the parts are made and assembled together in substantially the same manner as described above.

In both forms of the invention the non-cylindrical shape of the journal pin 12 and the corresponding shape of its contacting bearing sleeve serve to prevent the link 11 from sliding endwise from the projecting journal pins as will be obvious from the drawing.

While the form of embodiment of the present invention as herein disclosed, constitutes a preferred form, it is to be understood that other forms might be adopted, all coming within the scope of the claims which follow:

What is claimed is as follows:

1. A pivot joint connecting two relatively movable parts comprising: a pivot journal fixed to one of said parts having a non-cylindrical bearing surface, a split metal bushing thereupon shaped to conform to said bearing surface to prevent relative axial sliding between said bushing and journal, a resilient rubber bushing surrounding and vulcanized upon said split bushing and forming a permanently assembled unit therewith, a metal outer sleeve vulcanized upon said rubber bushing and forming a part of said unit, and a metal housing encasing said unit and maintaining said rubber bushing under compression by an axial compression thereupon.

2. In combination, a pivot journal having an enlarged end on its bearing surface, a bearing unit for said journal comprising: an expansible bearing bushing for said journal, a resilient rubber bushing, surrounding and yieldably urging closed said expansible bushing, and an outer metal sleeve compressing said rubber bushing and forming part of said unit, said bearing unit being insertable as a unit endwise over said enlarged end of said journal and thereafter retained in place by said enlarged head.

3. A pivot joint connecting two relatively movable parts, comprising: a pivot journal adapted to be fixed to one of said parts and having a non-cylindrical bearing surface, a self-lubricating metal bushing thereupon shaped to conform to said bearing surface and preventing relative axial sliding between said bushing and journal, a resilient rubber bushing surrounding said metal bushing and forming a permanently assembled unit therewith, and a metal outer sleeve encasing said rubber bushing under high initial compression and forming part of said unit, said unit being adapted to be tightly pressed axially into a recess in the other of said connected parts.

4. A pivot joint connecting two relatively movable parts, comprising: a pivot journal adapted to be fixed to one of said parts and having a peripheral circular flange on its bearing surface, a self-lubricating metal bushing thereupon shaped to conform to said bearing surface and preventing relative axial sliding between said bushing and journal, a resilient rubber bushing surrounding said metal bushing and forming a permanently assembled unit therewith, and a metal outer sleeve encasing said rubber bushing under high initial compression and forming part of said unit, said unit being adapted to be tightly pressed axially into a recess in the other of said connected parts.

5. A pivot joint comprising: a pivot journal adapted to be fixed to one of two parts connected by said pivot joint, said pivot journal having a peripheral circular flange on its bearing surface, a metal bushing rotatably mounted thereupon and shaped to conform to said peripheral flange and preventing relative axial movement between said bushing and journal, a resilient rubber bushing surrounding said metal bushing, and an outer metal sleeve encasing said rubber bushing under high initial compression and forming a permanently assembled unit with said metal bushing and rubber bushing, said unit being adapted to be tightly pressed axially into a recess in the other of the connected parts.

In testimony whereof I hereto affix my signature.

HARVEY D. GEYER.